(12) United States Patent
Wang et al.

(10) Patent No.: US 11,715,372 B2
(45) Date of Patent: Aug. 1, 2023

(54) SIGNAL LAMP RECOGNITION METHOD, DEVICE, AND STORAGE MEDIUM

(71) Applicant: Apollo intelligent Connectivity (Beijing) Technology Co., LTD., Beijing (CN)

(72) Inventors: Lei Wang, Beijing (CN); Qingzheng Sun, Beijing (CN); Shuqing Song, Beijing (CN); Yan Zhao, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 147 days.

(21) Appl. No.: 17/445,904

(22) Filed: Aug. 25, 2021

(65) Prior Publication Data

US 2021/0383692 A1 Dec. 9, 2021

(30) Foreign Application Priority Data

Dec. 23, 2020 (CN) .......................... 202011538830.1

(51) Int. Cl.
*G06V 20/58* (2022.01)
*G08G 1/096* (2006.01)
*G08G 1/0962* (2006.01)
*G06V 20/40* (2022.01)

(52) U.S. Cl.
CPC ............. *G08G 1/096* (2013.01); *G06V 20/44* (2022.01); *G06V 20/584* (2022.01); *G08G 1/0962* (2013.01); *G06V 2201/02* (2022.01)

(58) Field of Classification Search
CPC ... G06V 20/44; G06V 20/584; G06V 2201/02
See application file for complete search history.

(56) References Cited

U.S. PATENT DOCUMENTS

| 2016/0284215 A1* | 9/2016 | Ova | G06V 20/584 |
| 2020/0126406 A1* | 4/2020 | Ma | G08G 1/096716 |

FOREIGN PATENT DOCUMENTS

| CN | 108345838 A | 7/2018 |
| CN | 110688992 A | 1/2020 |
| DE | 102016009238 A1 * | 2/2017 |

(Continued)

OTHER PUBLICATIONS

Behrendt et al., (2017). "A deep learning approach to traffic lights: Detection, tracking, and classification," 2017 IEEE International Conference on Robotics and Automation, 1370-1377.

(Continued)

*Primary Examiner* — Andrew W Bee
(74) *Attorney, Agent, or Firm* — Morrison & Foerster LLP

(57) ABSTRACT

A signal lamp recognition method, a device, and a storage medium are provided, which are related to the field of intelligent transportation such as vehicle infrastructure cooperation, Internet of vehicles and the like. The method includes recognizing a plurality of video frames by using a signal lamp recognition model to obtain state information of a real signal lamp and state information of a simulated signal lamp; and determining a time delay between the real signal lamp and the simulated signal lamp according to the state information of the real signal lamp and the state information of the simulated signal lamp.

20 Claims, 6 Drawing Sheets

(56) References Cited

FOREIGN PATENT DOCUMENTS

DE      102019009104 A1 *  6/2021
JP          2021119462 A  *  8/2021    .......... G06K 9/00697
WO    WO-2018201835 A1 *  11/2018    ............... G06K 9/00

OTHER PUBLICATIONS

Chen et al., (2016). "Accurate and Reliable Detection of Traffic Lights Using Multiclass Learning and Multiobject Tracking," IEEE Intelligent Transportation Systems Magazine, 8(4):28-42.
Extended European Search Report received for European Patent Application No. 21193386.6 dated Feb. 16, 2022, 11 pages.

* cited by examiner

SIGNAL LAMP RECOGNITION METHOD, DEVICE, AND STORAGE MEDIUM

CROSS-REFERENCE TO RELATED APPLICATIONS

This application claims priority to Chinese patent application, No. 202011538830.1, entitled "Signal Lamp Recognition Method, Apparatus, Device, And Storage Medium", filed with the Chinese Patent Office on Dec. 23, 2020, which is hereby incorporated by reference in its entirety.

TECHNICAL FIELD

The present disclosure relates to the field of image processing, in particular to the field of intelligent transportation such as vehicle infrastructure cooperation, Internet of vehicles and the like.

BACKGROUND

The vehicle infrastructure cooperation provides more information for vehicles by means of a new generation of information communication technology. One application scene for the vehicle infrastructure cooperation is to provide countdown information of a traffic light to vehicles. For example, if a truck in front of a vehicle blocks the sight of the driver, the driver can know the real traffic light state through the countdown of the traffic light on an on-vehicle device. The traditional test method for this application scene is to perform manual test on site at an intersection, the length of time of the current real traffic light is recorded for comparing with the countdown of the traffic light displayed on an intelligent device so as to obtain the time delay.

SUMMARY

The present disclosure provides a signal lamp recognition method, an apparatus, a device, and a storage medium.

According to an aspect of the present disclosure, a signal lamp recognition method is provided, including:

recognizing a plurality of video frames by using a signal lamp recognition model to obtain state information of a real signal lamp and state information of a simulated signal lamp; and determining a time delay between the real signal lamp and the simulated signal lamp according to the state information of the real signal lamp and the state information of the simulated signal lamp.

According to another aspect of the present disclosure, a signal lamp recognition apparatus is provided, including:

a state determination unit configured for recognizing a plurality of video frames by using a signal lamp recognition model to obtain state information of a real signal lamp and state information of a simulated signal lamp; and a time delay determination unit configured for determining a time delay between the real signal lamp and the simulated signal lamp according to the state information of the real signal lamp and the state information of the simulated signal lamp.

According to another aspect of the present disclosure, an electronic device is provided, including:

at least one processor; and a memory communicatively connected with the at least one processor;

wherein, the memory stores instructions executable by the at least one processor, the instructions being executed by the at least one processor to enable the at least one processor to perform the method according to any embodiment of the present disclosure.

According to another aspect of the present disclosure, a non-transitory computer-readable storage medium storing computer instructions is provided, wherein the computer instructions are configured for enabling a computer to perform the method according to any embodiment of the present disclosure.

According to another aspect of the present disclosure, a computer program product is provided, including a computer program which, when executed by a processor, implements the method according to any embodiment of the present disclosure.

It should be understood that the contents described in this section are not intended to identify key or critical features of the embodiments of the present disclosure, nor are they intended to limit the scope of the present disclosure. Other features of the present disclosure will become readily apparent from the following description.

BRIEF DESCRIPTION OF THE DRAWINGS

The drawings are included to provide a better understanding of the present solution and not to be construed as limiting the present disclosure, in which.

DETAILED DESCRIPTION

The following describes exemplary embodiments of the present disclosure with reference to the accompanying drawings, which include various details of the embodiments of the present disclosure to facilitate understanding, and should be considered as merely exemplary. Accordingly, one of ordinary skill in the art appreciates that various changes and modifications can be made to the embodiments described herein without departing from the scope and spirit of the present disclosure. Also, descriptions of well-known functions and structures are omitted from the following description for clarity and conciseness.

Figure 1:
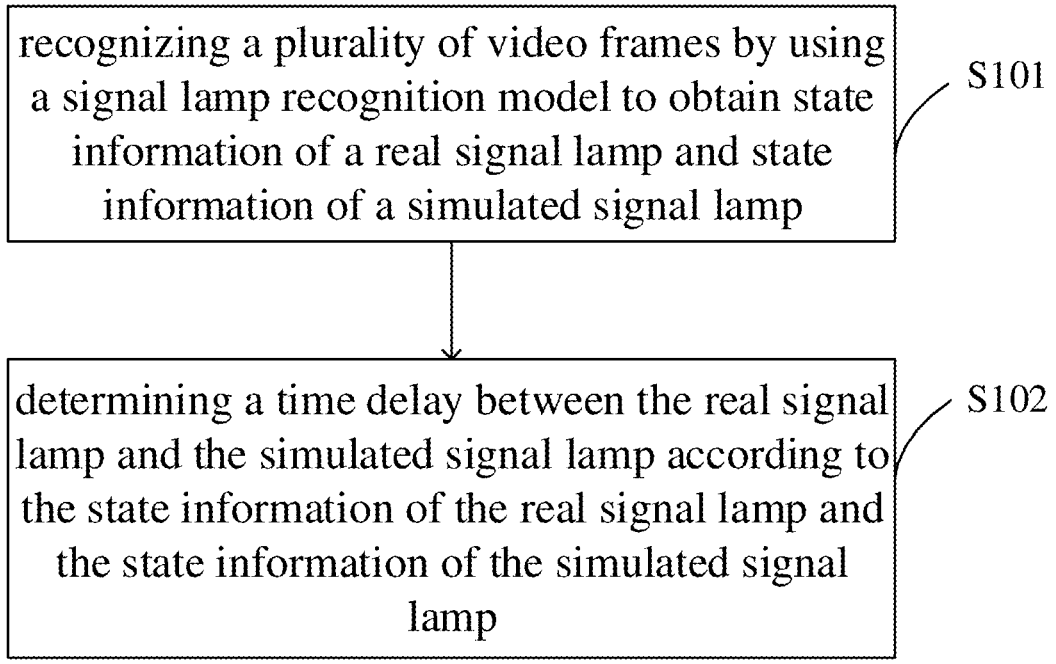
FIG. 1 is a flowchart of a signal lamp recognition method according to an embodiment of the present disclosure.

The present disclosure provides a signal lamp recognition method, specifically, FIG. 1 is a flowchart of a signal lamp recognition method according to an embodiment of the present disclosure. As shown in FIG. 1, the method includes:

Step S101: recognizing a plurality of video frames by using a signal lamp recognition model to obtain state information of a real signal lamp and state information of a simulated signal lamp; and Step S102: determining a time delay between the real signal lamp and the simulated signal lamp according to the state information of the real signal lamp and the state information of the simulated signal lamp.

In one exemplary scene, a video may be shot by using an image acquisition device. The video frame of the video can include both an image of a real signal lamp and an image of a simulated signal lamp. For example, a camera installed within the vehicle can capture a control interface of a vehicle-mounted device and an image of the environment outside the vehicle. When passing through an intersection provided with a signal lamp, the camera in the vehicle can simultaneously shoot a picture of a traffic light at the intersection outside the vehicle and a picture of a traffic light displayed on the control interface of the vehicle-mounted device. A plurality of video frames may be extracted from the video. The plurality of video frames are recognized through a pre-trained signal lamp recognition model to obtain state information of the real signal lamp and state information of the simulated signal lamp, including, for example, the time when the real signal lamp is in a red light state, in a green light state, and in a yellow light state; and the time when the simulated signal lamp is in a red light state, in a green light state, and in a yellow light state. Thus, according to the present solution, a time delay between the real signal lamp and the simulated signal lamp can be determined based on the state information of the real signal lamp and the state information of the simulated signal lamp in the video frame, without manually recording the states of the real signal lamp and the simulated signal lamp and calculating the time delay, so that the labor cost can be saved, and the accuracy of the time delay between the real signal lamp and the simulated signal lamp can be improved.

In addition, in comparison with data recorded based on the perception of human eyes, the state information of the real signal lamp and the state information of the simulated signal lamp are determined based on the video frame in the present disclosure, so that the accuracy of time delay between the real signal lamp and the simulated signal lamp is higher, and the accuracy is also higher based on the calculated time delay.

A subject for performing the present disclosure can include various computing devices, such as a calculator or a server and the like with computing functions, and the server can be a physical server or a virtual server. The computing device can be connected with an image acquisition device to obtain a video to be processed from the image acquisition device and perform frame division and other processing on the video so as to obtain a plurality of video frames to be recognized.

In the present disclosure, the real signal lamp may include a roadside device, such as a signal lamp disposed on a sentry box or a pillar at an intersection.

In the present disclosure, the simulated signal lamp may include a simulated signal lamp of a networking device. The networking device is interconnected with the roadside device through the vehicle networking technology to obtain the state information of the real signal lamp of the roadside device, and then the state information of the simulated signal lamp is updated based on the state information of the real signal lamp. That is, the simulated signal lamp is a signal lamp that may be used to simulate a real signal lamp.

The networking device may include a vehicle networking device, such as vehicle-mounted intelligent central control multimedia systems, intelligent rearview mirrors, and the like. The networking device may also include mobile devices with networking capabilities, such as smart phones, smart tablets, etc.

In a specific application, the real signal lamp and the simulated signal lamp may be specifically a traffic light, and the state information of the traffic light includes three states of a red light state, a yellow light state and a green light state.

In a particular application, when recognizing a video frame, it is necessary to distinguish the real signal lamp and the simulated signal lamp indicating different directions. For example, the real signal lamps include a straight-through real signal lamp, a left-turn real signal lamp and a right-turn real signal lamp. The simulated signal lamps include a straight-through simulated signal lamp, a left-turn simulated signal lamp and a right-turn simulated signal lamp.

Figure 2:
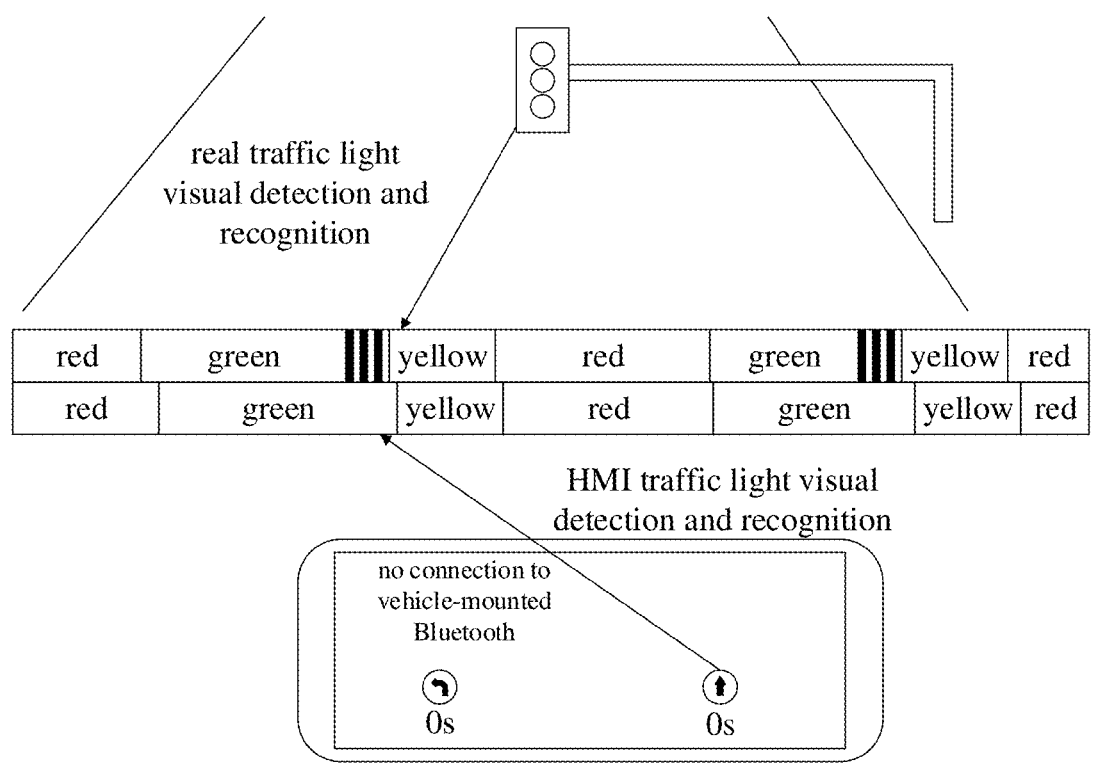
FIG. 2 is an exemplary diagram of a video frame in a specific example of a signal lamp recognition method according to an embodiment of the present disclosure.

In an actual scene, a plurality of video frames of the present disclosure may come from video data acquired by an image acquisition device. The image acquisition device can be arranged in a vehicle, and the process of acquiring the video data can be as follows: as an example, the image acquisition device shots a simulated signal lamp of an on-vehicle device and a real signal lamp of a roadside device, and the shooting effect can be referred to FIG. 2. As another example, the image acquisition device shoots a simulated signal lamp of a first on-vehicle device and a real signal lamp displayed on a second on-vehicle device, wherein the second on-vehicle device shoots a real signal lamp of the roadside device and displays the real signal lamp through a display screen, and the shooting effect can be referred to FIG. 3.

In a specific example of the present disclosure, recognizing a plurality of video frames by using the signal lamp recognition model further includes a step of performing frame division on a video to be processed to obtain a plurality of video frames on which the signal lamp recognition is required to be performed, wherein the video frames show the real signal lamp and the simulated signal lamp. Therefore, the video data are converted into video frame data, providing a foundation for subsequent signal lamp recognition with images. Moreover, a plurality of video frames are selected for recognition from the video to be processed, rather than the whole video to be processed, so that the workload is reduced.

As an example, frame division may be performed on the video to be processed according to a preset frame rate. For example, if the preset frame rate is 30 frames per second, one video frame is extracted every ⅓₀ second. That is, every two adjacent video frames are extracted with a time interval of ⅓₀ second.

In a specific example of the present disclosure, a training sample image of the signal lamp recognition model includes a signal lamp category, and the signal lamp category indicates that a signal lamp is a real signal lamp or a simulated signal lam. For example, in preparing the training sample image, a video frame is acquired from the video data, a signal lamp area is determined in the video frame, and a signal lamp category for the signal lamp area is labeled to obtain a training sample image. Thus, after the training of the signal lamp recognition model is completed, it can better identify whether the signal lamp recognized from the video frame is a real signal lamp or a simulated signal lamp.

In a specific example of the present disclosure, the training sample image further includes the state information of the signal lamp, the state information indicating a red light state, a green light state, or a yellow light state. For example, in preparing the training sample image, a video frame is acquired from the video data, a signal lamp area is determined in the video frame, and the state information for the signal lamp area is labeled to obtain a training sample image. Thus, after the training of the signal lamp recognition model is completed, it can better identify the state information of the signal lamp recognized from the video frame.

In a specific example of the present disclosure, determining a time delay between the real signal lamp and the simulated signal lamp according to the state information of the real signal lamp and the state information of the simulated signal lamp includes, firstly, determining a video frame corresponding to the real signal lamp and a video frame corresponding to the simulated signal lamp in a case of a same state switching according to the state information of the real signal lamp and the state information of the simulated signal lamp. For example, if a video frame, e.g., a 10th frame, is found at which the state of the real signal lamp is switched, a video frame at which the state of the simulated signal lamp is switched may be found through a pre-configured sliding window of 10s (i.e., in video frames within 10s after the 10th frame), which for example may be a 20th frame. In this way, the state switching of the real signal lamp at the 10th frame and the state switching of the simulated signal lamp at the 20th frame may be considered as the same state switching. Then, a time delay between the real signal lamp and the simulated signal lamp is determined according to the video frame corresponding to the real signal lamp and the video frame corresponding to the simulated signal lamp in the case of the same state switching. Therefore, in comparison with manual testing in which only the time delay of the level in second can be obtained, by adopting the present disclosure, the time delay is determined by taking the frame as a unit, and the difference of the level in millisecond can be obtained. Therefore, the time delay is reduced after the product architecture is upgraded, and the present solution can still be used for evaluating the product quality.

In a specific example of the present disclosure, the simulation method further includes generating a timeline of signal lamp state with a video frame as a time unit according to the state information of the real signal lamp and the state information of the simulated signal lamp. Therefore, the state information of the real signal lamp and the simulated signal lamp corresponding to the same time point is conveniently aligned in the form of a timeline, the state information of the signal lamp is presented in the form of a graph, and the test result is more visual. For example, in FIG. 2, a timeline of signal lamp state in which a video frame is used as a time unit is shown. In the timeline, a result of visual detection and recognition for a real traffic light is shown at the upper side, and a result of visual detection and recognition for a traffic light of a human machine interface (HMI) of a vehicle-mounted device is shown at the lower side. The difference between the real signal lamp and the simulated signal lamp can be directly understood from FIG. 2, so that the time point of state switching can be quickly identified, and the time delay can be determined.

In a specific example of the present disclosure, it further includes statistically obtaining at least one of switching time points of the real signal lamp and the simulated signal lamp, an average time delay, a maximum time delay and a minimum time delay between the real signal lamp and the simulated signal lamp according to the state information of the real signal lamp and the state information of the simulated signal lamp. Therefore, automatic data statistics is implemented, and the workload of testers is reduced. In addition, a plurality of data items are provided, such as switching time points, the average time delay, the maximum time delay, the minimum time delay and the like, and the testers can evaluate the scene of the simulated signal lamp more comprehensively and accurately.

The technical solution of the disclosure is described in further detail below with reference to specific examples.

(1) A process of training a model:

Firstly, frame division is performed. A video to be processed is preprocessed by using a multimedia video processing tool such as FFMPEG (Fast Forward MPEG) to obtain an image after frame division. FFMPEG is an open source computer program that can be used to record and convert digital audio and video and convert the same into streams. MPEG (Moving Picture Experts Group) is an international standard organization in multimedia field.

Figure 3:
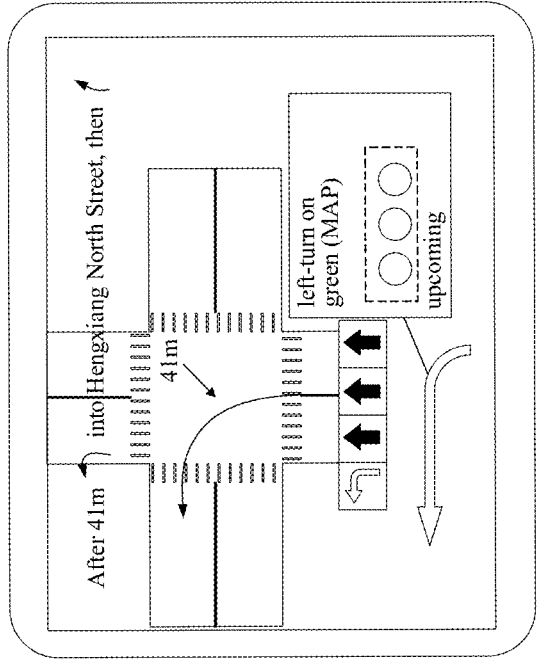
FIG. 3 is an exemplary diagram of a video frame in another specific example of a signal lamp recognition method according to an embodiment of the present disclosure.

The image after frame division is labeled, which includes labeling a real traffic light and a simulated traffic light (such as a countdown of a traffic light displayed on a vehicle-mounted device) in the image. Referring to FIG. 3, firstly, a box is used as a label type to label a real traffic light and a simulated traffic light in an image. Then, a target category is selected for each box, wherein options of the target category include: left-turn on red (real), straight-through on red (real), right-turn on red (real), left-turn on green (real), straight-through on green (real), right-turn on green (real), left-turn on yellow (real), straight-through on yellow (real), right-turn on yellow (real), left-turn on red (MAP), straight-through on red (MAP), right-turn on red (MAP), left-turn on green (MAP), straight-through on green (MAP), right-turn on green (MAP), left-turn on yellow (MAP), straight-through on yellow (MAP), and right-turn on yellow (MAP). Here, "(real)" indicates a real traffic light, and (MAP) indicates a simulated traffic light. After the labeling work is completed, a training sample image set can be obtained.

The information of the training sample image set is extracted for data conversion to obtain light colors of the real traffic light in all directions and light colors of a traffic light displayed by the vehicle-mounted device, and model training is performed by taking the information as a model training set and adopting a deep learning model Faster-Rcnn (multi-product fusion model) to obtain a signal lamp recognition model.

Figure 4:
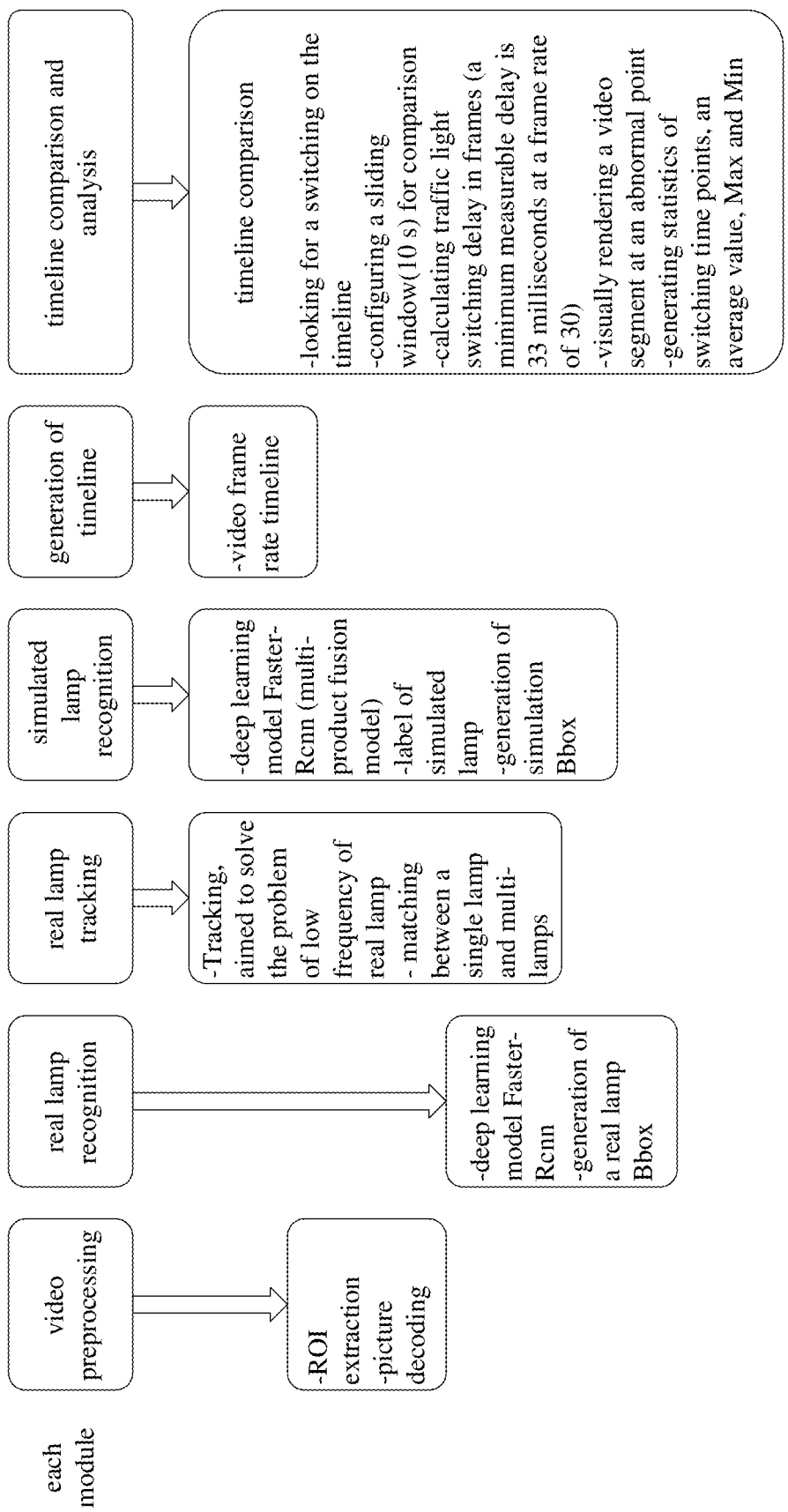
FIG. 4 is a flowchart of a specific example of a signal lamp recognition method according to an embodiment of the present disclosure.

(2) A process of recognizing a signal lamp:

Referring to FIG. 4, a process flow diagram for each module in the signal lamp recognition process is shown, which is described in details as follows.

A video preprocessing module is configured for decoding an image and extracting a region of interest (ROI). Decoding an image includes performing frame division on video data to be processed to obtain a plurality of video frames to be recognized. The extraction of a region of interest includes determining a signal lamp region of interest from each video frame.

A real lamp recognition module is configured for recognizing a plurality of video frames by using a model (i.e. a signal lamp recognition model) obtained through the training based on the deep learning model Faster-Rcnn, to obtain state information of a real signal lamp bounding box (Bbox) in the video frames.

A real lamp tracking module is provided due to the fact that a low frequency of a real traffic light is caused because the real traffic light may flash or be blocked by a vehicle. Therefore, after the recognition of a real signal lamp, the real signal lamp is tracked. For example, in real signal lamp recognition results corresponding to a plurality of video frames, for the real lamp state information which cannot be recognized between the 10th frame and the 25th frame, the real lamp recognition results of the video frames before the 10th frame and after the 25th frame are used to supplement the real lamp recognition results between the 10th frame and the 25th frame.

In addition, since the case of a real traffic light is often complicated, matching between a single light and a plurality of lights is required. For example, in FIG. 3, a plurality of straight-through red lights simultaneously appear in the real traffic light, in this case the plurality of straight-through red lights are taken as one real straight-through red light so as to be aligned and compared with the simulated signal lamp.

A simulated lamp recognition module is configured for recognizing a plurality of video frames by using a model (i.e. a signal lamp recognition model) obtained through the training based on the deep learning model Faster-Rcnn, to obtain state information of a simulated signal lamp bounding box (Bbox) in the video frames.

A timeline generating module is configured for generating a video frame rate timeline according to the real lamp recognition results and the simulated lamp recognition results of the plurality of video frames.

A timeline comparison module is configured for searching a switching point on the video frame rate timeline, namely a video frame in which state switching occurs. A sliding window (10s) may be configured for comparison to realize the determination of the time delay between the real signal lamp and the simulated signal lamp in a case that video frames show the same state switching. For example, a real signal lamp switches its state at the 10th frame, a video frame in which the simulated signal lamp switches its state is searched through the sliding window of 10s within 10s after the 10th frame, and the both state switching above are compared as the same state switching. The traffic light switching delay is calculated in frames, for example, if the frame rate is 30 frames per second, a minimum measurable delay is 33 milliseconds. A video segment at an abnormal point is visually rendered. For example, if the state information cannot be recognized due to the flash of a real traffic light, causing that a black line appears in the timeline, the abnormal point can be rendered by referring to the lamp color at a nearest normal point. Finally, statistics of switching time points, an average value, a maximum time delay Max and a minimum time delay Min can be generated.

Figure 5:
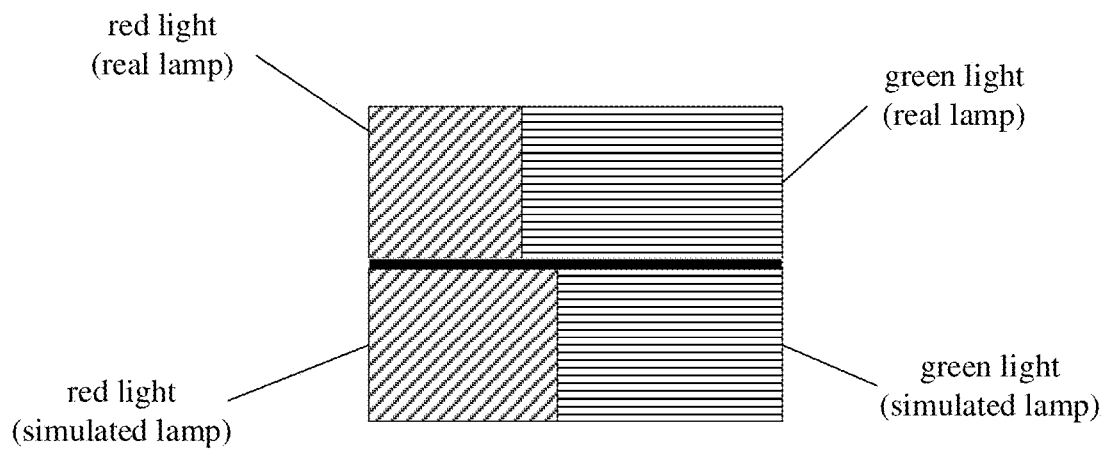
FIG. 5 is a diagram illustrating a comparison of signal lamp recognition results in a specific example of a signal lamp recognition method according to an embodiment of the present disclosure.

Referring to FIG. 5, it is an exemplary result of an analysis based on the solution, the upper row in FIG. 5 shows the color of a real straight-through traffic light, and the lower row shows the color of a straight-through traffic light displayed on a vehicle-mounted device.

Referring to Table 1, Table 1 is an example of switching time points of a real straight-through traffic light and a straight-through traffic light on the vehicle-mounted device.

TABLE 1

| Time point of a simulated signal lamp | Time point of a real signal lamp | Time delay (Seconds) |
|---|---|---|
| 00:04:800 | 00:04:470 | 0.33 |

Therefore, according to the method of the present disclosure, the time delay between the countdown of a real traffic light and a traffic light on a vehicle-mounted device can be accurately obtained by video analysis and artificial intelligence model training, to evaluate the scene comprehensively and accurately.

According to the present disclosure, a tester is not required to record and manually calculate the time delay of switching light colors at each intersection, so that the test cost is low, and the test period is shortened.

According to the present disclosure, the reusability is high. After the architecture is upgraded, the algorithm can be directly used for effectively evaluating the accuracy of data to obtain the difference between a real traffic light and a traffic light displayed on a vehicle-mounted device.

Figure 6:
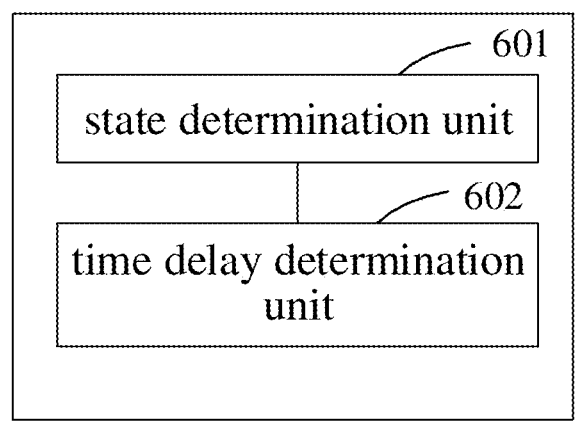
FIG. 6 is a schematic structural diagram of a signal lamp recognition apparatus according to an embodiment of the present disclosure.

The present disclosure provides a signal lamp recognition apparatus, and specifically, as shown in FIG. 6, the apparatus may include:

a state determination unit 601 configured for recognizing a plurality of video frames by using a signal lamp recognition model to obtain state information of a real signal lamp and state information of a simulated signal lamp; and a time delay determination unit 602 configured for determining a time delay between the real signal lamp and the simulated signal lamp according to the state information of the real signal lamp and the state information of the simulated signal lamp.

In a specific example of the present disclosure, the apparatus may further include:

a video frame acquisition unit configured for performing frame division on a video to be processed to obtain a plurality of video frames on which the signal lamp recognition is required to be performed, wherein the video frames show the real signal lamp and the simulated signal lamp. In a specific example of the present disclosure, a training sample image of a training signal lamp recognition model includes a signal lamp category, and the signal lamp category indicates that a signal lamp is a real signal lamp or a simulated signal lamp.

In a specific example of the present disclosure, the training sample image further includes the state information of the signal lamp, the state information indicating a red light state, a green light state, or a yellow light state.

In a specific example of the present disclosure, the time delay determination unit, which is configured for determining the time delay between the real signal lamp and the simulated signal lamp according to the state information of the real signal lamp and the state information of the simulated signal lamp, includes:

a switching video frame subunit configured for determining a video frame corresponding to the real signal lamp and a video frame corresponding to the simulated signal lamp in a case of a same state switching according to the state information of the real signal lamp and the state information of the simulated signal lamp; and a time delay determination subunit configured for determining the time delay between the real signal lamp and the simulated signal lamp according to the video frame corresponding to the real signal lamp and the video frame corresponding to the simulated signal lamp in the case of the same state switching.

In a specific example of the present disclosure, the apparatus may further include:

a timeline generation unit configured for generating a timeline of signal lamp state with a video frame as a time unit according to the state information of the real signal lamp and the state information of the simulated signal lamp.

In a specific example of the present disclosure, the apparatus may further include:

a statistical unit configured for statistically obtaining at least one of switching time points of the real signal lamp and the simulated signal lamp, an average time delay, a maximum time delay and a minimum time delay between the real signal lamp and the simulated signal lamp according to the state information of the real signal lamp and the state information of the simulated signal lamp. According to an embodiment of the present disclosure, the present disclosure also provides an electronic device, a readable storage medium and a computer program product.

Figure 7:
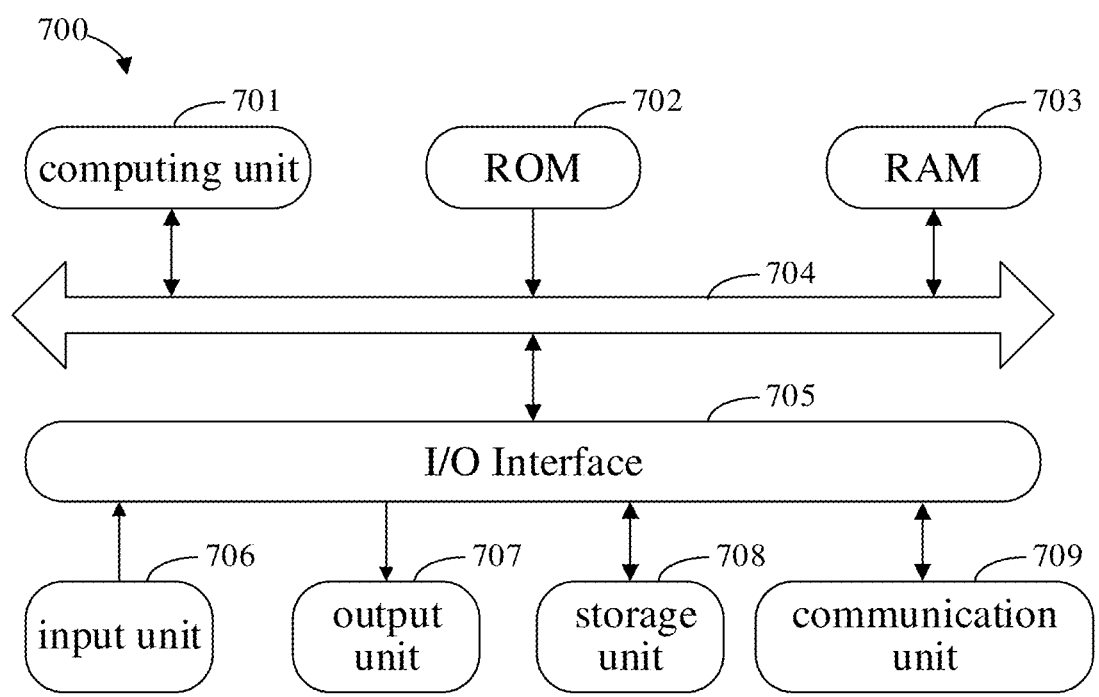
FIG. 7 is a block diagram of an electronic device used to implement a signal lamp recognition method according to an embodiment of the present disclosure.

FIG. 7 illustrates a schematic block diagram of an exemplary electronic device 700 that may be used to implement embodiments of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processors, cellular telephones, smart phones, wearable devices, and other similar computing devices. The components, their connections and relationships, and their functions are shown herein by way of example only and are not intended to limit the implementations of the present disclosure described and/or claimed herein.

As shown in FIG. 7, the device 700 includes a computing unit 701 that may perform various suitable actions and processes in accordance with a computer program stored in a read only memory (ROM) 702 or a computer program loaded from a storage unit 708 into a random access memory (RAM) 703. In the RAM 703, various programs and data required for the operation of the storage device 700 can also be stored. The computing unit 701, the ROM 702 and the RAM 703 are connected to each other through a bus 704. An input/output (I/O) interface 705 is also connected to the bus 704.

A number of components in the device 700 are connected to the I/O interface 705, including an input unit 706, such as a keyboard, a mouse, etc.; an output unit 707, such as various types of displays, speakers, etc.; a storage unit 708, such as a magnetic disk, an optical disk, etc.; and a communication unit 709, such as a network card, a modem, a wireless communication transceiver, etc. The communication unit 709 allows the device 700 to exchange information/data with other apparatuses over a computer network, such as the Internet, and/or various telecommunication networks.

The computing unit 701 may be various general purpose and/or special purpose processing components having processing and computing capabilities. Some examples of the computing unit 701 include, but are not limited to, a central processing unit (CPU), a graphics processing unit (GPU), various specialized artificial intelligence (AI) computing chips, various computing units running machine learning model algorithms, a digital signal processor (DSP), and any suitable processor, controller, microcontroller, etc. The computing unit 701 performs various methods and processes described above, such as a signal lamp recognition method. For example, in some embodiments, the signal lamp recognition method may be implemented as a computer software program tangibly contained in a machine-readable medium, such as the storage unit 708. In some embodiments, some or all of the computer programs may be loaded into and/or installed on the device 700 via the ROM 702 and/or communication unit 709. When the computer program is loaded into the RAM 703 and executed by the computing unit 701, one or more steps of the signal lamp recognition method described above may be performed. Alternatively, in other embodiments, the computing unit 701 may be configured to perform the signal lamp recognition method by any other suitable means (e.g., via a firmware).

Various implementations of the systems and techniques described herein above may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software, and/or combinations thereof. These various embodiments may include an implementation in one or more computer programs, which can be executed and/or interpreted on a programmable system including at least one programmable processor; the programmable processor can be a dedicated or general-purpose programmable processor, which can receive data and instructions from, and transmit data and instructions to, a memory system, at least one input device, and at least one output device.

Program codes for implementing the methods of the present disclosure may be edited in any combination of one or more programming languages. These program codes may be provided to a processor or controller of a general purpose computer, a special purpose computer, or other programmable data processing units such that the program codes, when executed by the processor or controller, cause the functions/operations specified in the flowchart and/or block diagram to be performed. The program codes may be executed entirely on a machine, partly on a machine, partly on a machine as a stand-alone software package and partly on a remote machine or entirely on a remote machine or server.

In the context of this disclosure, a machine-readable medium can be a tangible medium that may contain or store a program for use by or in connection with an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semi-conductive systems, apparatus or device, or any suitable combination thereof. More specific examples of the machine-readable storage medium may include electrical connections based on one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof.

To provide an interaction with a user, the systems and techniques described herein may be implemented on a computer having a display device (for example, a cathode ray tube (CRT) or an liquid crystal display (LCD) monitor) for displaying information to the user; and a keyboard and a pointing device (e.g., a mouse or a trackball) through which a user can provide input to the computer. Other types of devices may also be used to provide an interaction with a user. For example, the feedback provided to the user may be any form of sensory feedback (e.g., visual feedback, auditory feedback, or tactile feedback); and the inputs from the user may be received in any form, including acoustic input, voice input, or tactile input.

The systems and techniques described herein may be implemented in a computing system (e.g., as a data server) that includes a background component, or a computing system (e.g., an application server) that includes a middleware component, or a computing system (e.g., a user computer having a graphical user interface or a web browser through which a user may interact with embodiments of the systems and techniques described herein) that includes a front-end component, or a computing system that includes any combination of such background components, middleware components, or front-end components. The components of the system may be interconnected by any form or medium of digital data communication (e.g., a communication network). Examples of communication networks include Local Area Network (LAN), Wide Area Network (WAN), and Internet.

The computer system may include a client and a server. The client and the server are typically remote from each other and typically interact via the communication network. The relationship of the client and the server is generated by computer programs running on respective computers and having a client-server relationship with each other.

It should be understood that the steps in the various processes described above may be reordered or omitted, or other steps may be added therein. For example, the steps described in the present disclosure may be performed in parallel or sequentially or may be performed in a different order, so long as the desired result of the technical solutions disclosed in the present disclosure can be achieved, and no limitation is made herein.

Above specific embodiments do not constitute a limitation on the protection scope of the present disclosure. It should be understood by those skilled in the art that various modifications, combinations, sub-combinations, and substitutions may be available according to design requirements and other factors. Any modifications, equivalent replacements and improvements made within the spirit and principle of the present disclosure shall be covered within the protection scope of the present disclosure.

What is claimed is:

1. A signal lamp recognition method, comprising:
   recognizing a plurality of video frames by using a signal lamp recognition model to obtain state information of a real signal lamp and state information of a simulated signal lamp; and
   determining a time delay between the real signal lamp and the simulated signal lamp according to the state information of the real signal lamp and the state information of the simulated signal lamp.

2. The signal lamp recognition method according to claim 1, further comprising:
   performing frame division on a video to be processed to obtain a plurality of video frames on which the signal lamp recognition is required to be performed, wherein the video frames show the real signal lamp and the simulated signal lamp.

3. The signal lamp recognition method according to claim 2, wherein a training sample image of the signal lamp recognition model comprises a signal lamp category, and the signal lamp category indicates that a signal lamp is a real signal lamp or a simulated signal lamp.

4. The signal lamp recognition method according to claim 3, wherein the training sample image further comprises the state information of the signal lamp, the state information indicating a red light state, a green light state, or a yellow light state.

5. The signal lamp recognition method according to claim 1, wherein the determining the time delay between the real signal lamp and the simulated signal lamp according to the state information of the real signal lamp and the state information of the simulated signal lamp, comprises:
   determining a video frame corresponding to the real signal lamp and a video frame corresponding to the simulated signal lamp in a case of a same state switching according to the state information of the real signal lamp and the state information of the simulated signal lamp; and
   determining the time delay between the real signal lamp and the simulated signal lamp according to the video frame corresponding to the real signal lamp and the video frame corresponding to the simulated signal lamp in the case of the same state switching.

6. The signal lamp recognition method according to claim 1, further comprising:
   generating a timeline of signal lamp state with a video frame as a time unit according to the state information of the real signal lamp and the state information of the simulated signal lamp.

7. The signal lamp recognition method according to claim 1, further comprising:
   statistically obtaining at least one of switching time points of the real signal lamp and the simulated signal lamp, an average time delay, a maximum time delay and a minimum time delay between the real signal lamp and the simulated signal lamp according to the state information of the real signal lamp and the state information of the simulated signal lamp.

8. An electronic device, comprising:
   at least one processor; and
   a memory communicatively connected with the at least one processor;
   wherein the memory stores instructions executable by the at least one processor, the instructions being executed by the at least one processor to enable the at least one processor to:
   recognize a plurality of video frames by using a signal lamp recognition model to obtain state information of a real signal lamp and state information of a simulated signal lamp; and
   determine a time delay between the real signal lamp and the simulated signal lamp according to the state information of the real signal lamp and the state information of the simulated signal lamp.

9. The electronic device according to claim 8, wherein the instructions are executed by the at least one processor to enable the at least one processor to:
   perform frame division on a video to be processed to obtain a plurality of video frames on which the signal lamp recognition is required to be performed, wherein the video frames show the real signal lamp and the simulated signal lamp.

10. The electronic device according to claim 9, wherein a training sample image of the signal lamp recognition model comprises a signal lamp category, and the signal lamp category indicates that a signal lamp is a real signal lamp or a simulated signal lamp.

11. The electronic device according to claim 10, wherein the training sample image further comprises the state information of the signal lamp, the state information indicating a red light state, a green light state, or a yellow light state.

12. The electronic device according to claim 8, wherein the instructions are executed by the at least one processor to enable the at least one processor to:
   determine a video frame corresponding to the real signal lamp and a video frame corresponding to the simulated signal lamp in a case of a same state switching according to the state information of the real signal lamp and the state information of the simulated signal lamp; and
   determine the time delay between the real signal lamp and the simulated signal lamp according to the video frame corresponding to the real signal lamp and the video frame corresponding to the simulated signal lamp in the case of the same state switching.

13. The electronic device according to claim 8, wherein the instructions are executed by the at least one processor to enable the at least one processor to:
generate a timeline of signal lamp state with a video frame as a time unit according to the state information of the real signal lamp and the state information of the simulated signal lamp.

14. The electronic device according to claim 8, wherein the instructions are executed by the at least one processor to enable the at least one processor to:
statistically obtain at least one of switching time points of the real signal lamp and the simulated signal lamp, an average time delay, a maximum time delay and a minimum time delay between the real signal lamp and the simulated signal lamp according to the state information of the real signal lamp and the state information of the simulated signal lamp.

15. A non-transitory computer-readable storage medium storing computer instructions, wherein the computer instructions, when executed by a computer, cause the computer to:
recognize a plurality of video frames by using a signal lamp recognition model to obtain state information of a real signal lamp and state information of a simulated signal lamp; and
determine a time delay between the real signal lamp and the simulated signal lamp according to the state information of the real signal lamp and the state information of the simulated signal lamp.

16. The non-transitory computer-readable storage medium according to claim 15, wherein the computer instructions, when executed by the computer, cause the computer to:
perform frame division on a video to be processed to obtain a plurality of video frames on which the signal lamp recognition is required to be performed, wherein the video frames show the real signal lamp and the simulated signal lamp.

17. The non-transitory computer-readable storage medium according to claim 16, a training sample image of the signal lamp recognition model comprises a signal lamp category, and the signal lamp category indicates that a signal lamp is a real signal lamp or a simulated signal lamp.

18. The non-transitory computer-readable storage medium according to claim 17, wherein the training sample image further comprises the state information of the signal lamp, the state information indicating a red light state, a green light state, or a yellow light state.

19. The non-transitory computer-readable storage medium according to claim 15, wherein the computer instructions, when executed by the computer, cause the computer to:
determine a video frame corresponding to the real signal lamp and a video frame corresponding to the simulated signal lamp in a case of a same state switching according to the state information of the real signal lamp and the state information of the simulated signal lamp; and
determine the time delay between the real signal lamp and the simulated signal lamp according to the video frame corresponding to the real signal lamp and the video frame corresponding to the simulated signal lamp in the case of the same state switching.

20. The non-transitory computer-readable storage medium according to claim 15, wherein the computer instructions, when executed by the computer, cause the computer to:
generate a timeline of signal lamp state with a video frame as a time unit according to the state information of the real signal lamp and the state information of the simulated signal lamp.

* * * * *